United States Patent
Li et al.

(10) Patent No.: US 11,366,560 B2
(45) Date of Patent: Jun. 21, 2022

(54) TOUCH SUBSTRATE, METHOD FOR MANUFACTURING THE SAME AND TOUCH DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Zhentao Li, Beijing (CN); Qingpu Wang, Beijing (CN); Yajun Ma, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/344,319

(22) Filed: Jun. 10, 2021

(65) Prior Publication Data
US 2021/0405821 A1 Dec. 30, 2021

(30) Foreign Application Priority Data
Jun. 29, 2020 (CN) .......................... 202010611222.2

(51) Int. Cl.
*G06F 3/041* (2006.01)
*G06F 3/044* (2006.01)

(52) U.S. Cl.
CPC .......... *G06F 3/0446* (2019.05); *G06F 3/0412* (2013.01); *G06F 2203/04103* (2013.01); *G06F 2203/04111* (2013.01); *G06F 2203/04112* (2013.01)

(58) Field of Classification Search
CPC combination set(s) only.
See application file for complete search history.

(56) References Cited

U.S. PATENT DOCUMENTS

2016/0041643 A1* 2/2016 Gu ....................... G06F 3/0443
345/174
2017/0250230 A1* 8/2017 Xiong .................. H01L 27/323

* cited by examiner

*Primary Examiner* — Deeprose Subedi
(74) *Attorney, Agent, or Firm* — Muncy, Geissler, Olds & Lowe, P.C.

(57) ABSTRACT

The present disclosure provides a touch substrate, a method for manufacturing the touch substrate and a touch display device. The touch substrate includes a base substrate, a plurality of driving electrodes and a plurality of sensing electrodes arranged at different layers on the base substrate, and a black matrix arranged at a peripheral region of the touch substrate. Orthogonal projections of the driving electrodes onto the base substrate overlap orthogonal projections of the sensing electrodes onto the base substrate at a plurality of first overlapping regions and a plurality of second overlapping regions, an orthogonal projection of the black matrix onto the base substrate overlaps each first overlapping region and does not overlap each second overlapping region, and an effective area of the first overlapping region is smaller than an effective area of the second overlapping region.

20 Claims, 12 Drawing Sheets

TOUCH SUBSTRATE, METHOD FOR MANUFACTURING THE SAME AND TOUCH DISPLAY DEVICE

CROSS-REFERENCE TO RELATED APPLICATION

This application claims a priority of the Chinese patent application No. 202010611222.2 filed on Jun. 29, 2020, which is incorporated herein by reference in its entirety.

TECHNICAL FIELD

The present disclosure relates to the field of touch technology, in particular to a touch substrate, a method manufacturing the touch substrate, and a display device.

BACKGROUND

Recently, mobile electronic devices have become a basic necessity of life, a touch panel is a standard configuration of the mobile electronic device, and facilitates a user's operation. Currently, there are various touch panels, and a capacitive touch panel has become a mainstream product due to low manufacture cost and excellent performance. The capacitive touch panel includes an On Glass Metal (OGM) touch panel manufactured through metal plating and including a metal mesh.

SUMMARY

In one aspect, the present disclosure provides in some embodiments a touch substrate, including a base substrate, a plurality of driving electrodes and a plurality of sensing electrodes arranged at different layers on the base substrate, and a black matrix arranged at a peripheral region of the touch substrate. Orthogonal projections of the driving electrodes onto the base substrate overlap orthogonal projections of the sensing electrodes onto the base substrate at a plurality of first overlapping regions and a plurality of second overlapping regions, an orthogonal projection of the black matrix onto the base substrate overlaps each first overlapping region and does not overlap each second overlapping region, and an effective area of the first overlapping region is smaller than an effective area of the second overlapping region.

In a possible embodiment of the present disclosure, when each of the driving electrodes and the sensing electrodes is of a mesh-like structure, the effective area of each first overlapping region is a sum of areas of overlapping regions formed by orthogonal projections of mesh bars of the driving electrode onto the base substrate and orthogonal projections of mesh bars of the sensing electrode onto the base substrate in the first overlapping region, and the effective area of each second overlapping region is a sum of areas of overlapping regions formed by orthogonal projections of mesh bars of the driving electrode onto the base substrate and orthogonal projections of mesh bars of the sensing electrode onto the base substrate in the second overlapping region.

In a possible embodiment of the present disclosure, each driving electrode is of a mesh-like structure, the driving electrodes include first central driving electrodes and first peripheral driving electrodes, an orthogonal projection of each first central driving electrode onto the base substrate does not overlap the orthogonal projection of the black matrix onto the base substrate, an orthogonal projection of each first peripheral driving electrode onto the base substrate is located within the orthogonal projection of the black matrix onto the base substrate, and a mesh density of each first peripheral driving electrode is smaller than a mesh density of each first central driving electrode.

In a possible embodiment of the present disclosure, each sensing electrode is of a mesh-like structure, the sensing electrodes include first central sensing electrodes and first peripheral sensing electrodes, an orthogonal projection of each first central sensing electrode onto the base substrate does not overlap the orthogonal projection of the black matrix onto the base substrate, an orthogonal projection of each first peripheral sensing electrode onto the base substrate is located within the orthogonal projection of the black matrix onto the base substrate, and a mesh density of each first peripheral sensing electrode is smaller than a mesh density of each first central sensing electrode.

In a possible embodiment of the present disclosure, the mesh density of each first peripheral driving electrode is half of the mesh density of each first central driving electrode.

In a possible embodiment of the present disclosure, the mesh density of each first peripheral sensing electrode is half of the mesh density of each first central sensing electrode.

In a possible embodiment of the present disclosure, the driving electrodes extend in a first direction and include second central driving electrodes and second peripheral driving electrodes, an orthogonal projection of each second central driving electrode onto the base substrate partially overlaps the orthogonal projection of the black matrix onto the base substrate, an orthogonal projection of each second peripheral driving electrode onto the base substrate is located within the orthogonal projection of the black matrix onto the base substrate, and a maximum width of each second peripheral driving electrode is smaller than a maximum width of each second central driving electrode in a direction perpendicular to the first direction.

In a possible embodiment of the present disclosure, the sensing electrodes extend in a second direction and include second central sensing electrodes and second peripheral sensing electrodes, an orthogonal projection of each second central sensing electrode onto the base substrate partially overlaps the orthogonal projection of the black matrix onto the base substrate, an orthogonal projection of each second peripheral sensing electrode onto the base substrate is located within the orthogonal projection of the black matrix onto the base substrate, and a maximum width of each second peripheral sensing electrode is smaller than a maximum width of each second central sensing electrode in a direction perpendicular to the second direction.

In a possible embodiment of the present disclosure, the maximum width of each second peripheral driving electrode is half of the maximum width of each second central driving electrode in the direction perpendicular to the first direction.

In a possible embodiment of the present disclosure, the maximum width of each second peripheral sensing electrode is half of the maximum width of each second central sensing electrode in the direction perpendicular to the second direction.

In a possible embodiment of the present disclosure, the touch substrate further includes: a plurality of first dummy electrodes arranged at a same layer as the plurality of sensing electrodes, each first dummy electrode being of a same structure as the sensing electrode and being insulated from the corresponding sensing electrode; and a plurality of second dummy electrodes arranged at a same layer as the plurality of driving electrodes, each second dummy electrode being of a same structure as the driving electrode and being insulated from the corresponding driving electrode.

In a possible embodiment of the present disclosure, the touch substrate further includes an insulation layer arranged between the sensing electrode and the driving electrode.

In a possible embodiment of the present disclosure, the sensing electrode is arranged between the driving electrode and the base substrate.

In another aspect, the present disclosure provides in some embodiments a touch display device including the above-mentioned touch substrate and a display panel. The touch substrate is arranged at a light-exiting side of the display panel, and an orthogonal projection of the peripheral region of the touch substrate onto the display panel overlaps a non-display region of the display panel.

In a possible embodiment of the present disclosure, the driving electrodes and the sensing electrodes of the touch substrate are arranged between the display panel and the base substrate of the touch substrate.

In yet another aspect, the present disclosure provides in some embodiments a method for manufacturing the above-mentioned touch substrate, including: forming a black matrix on a base substrate, the black matrix being arranged at the peripheral region of the touch substrate; and forming a plurality of driving electrodes and a plurality of sensing electrodes at different layers on the base substrate. Orthogonal projections of the driving electrodes onto the base substrate overlap orthogonal projections of the sensing electrodes onto the base substrate at a plurality of first overlapping regions and a plurality of second overlapping regions, an orthogonal projection of the black matrix onto the base substrate overlaps each first overlapping region and does not overlap each second overlapping region, and an effective area of the first overlapping region is smaller than an effective area of the second overlapping region.

In a possible embodiment of the present disclosure, the forming the plurality of sensing electrodes on the base substrate includes: forming a first conductive thin film on the base substrate; and patterning the first conductive thin film to form the sensing electrodes and first dummy electrodes each of a mesh-like structure.

In a possible embodiment of the present disclosure, each sensing electrode is of a mesh-like structure, the sensing electrodes include first central sensing electrodes and first peripheral sensing electrodes, an orthogonal projection of each first central sensing electrode onto the base substrate does not overlap the orthogonal projection of the black matrix onto the base substrate, an orthogonal projection of each first peripheral sensing electrode onto the base substrate is located within the orthogonal projection of the black matrix onto the base substrate, and a mesh density of each first peripheral sensing electrode is smaller than a mesh density of each first central sensing electrode; or the sensing electrodes extend in a second direction and include second central sensing electrodes and second peripheral sensing electrodes, an orthogonal projection of each second central sensing electrode onto the base substrate partially overlaps the orthogonal projection of the black matrix onto the base substrate, an orthogonal projection of each second peripheral sensing electrode onto the base substrate is located within the orthogonal projection of the black matrix onto the base substrate, and a maximum width of each second peripheral sensing electrode is smaller than a maximum width of each second central sensing electrode in a direction perpendicular to the second direction.

In a possible embodiment of the present disclosure, the forming the plurality of driving electrodes on the base substrate includes: forming an insulation layer at a side of each sensing electrode away from the base substrate; forming a second conductive thin film at a side of the insulation layer away from the base substrate; and patterning the second conductive thin film to form the driving electrodes and second dummy electrodes each of a mesh-like structure.

In a possible embodiment of the present disclosure, each driving electrode is of a mesh-like structure, the driving electrodes include first central driving electrodes and first peripheral driving electrodes, an orthogonal projection of each first central driving electrode onto the base substrate does not overlap the orthogonal projection of the black matrix onto the base substrate, an orthogonal projection of each first peripheral driving electrode onto the base substrate is located within the orthogonal projection of the black matrix onto the base substrate, and a mesh density of each first peripheral driving electrode is smaller than a mesh density of each first central driving electrode; or the driving electrodes extend in a first direction and include second central driving electrodes and second peripheral driving electrodes, an orthogonal projection of each second central driving electrode onto the base substrate partially overlaps the orthogonal projection of the black matrix onto the base substrate, an orthogonal projection of each second peripheral driving electrode onto the base substrate is located within the orthogonal projection of the black matrix onto the base substrate, and a maximum width of each second peripheral driving electrode is smaller than a maximum width of each second central driving electrode in a direction perpendicular to the first direction.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. In these drawings.

DETAILED DESCRIPTION

The present disclosure will be described hereinafter in conjunction with the drawings and embodiments.

In the related art, during the manufacture and use of an OGM touch panel, there is insufficient capacitance consistency between a peripheral channel and an in-plane channel, so the yield of the touch panel may be adversely affected and a touch failure may easily occur.

Figure 1:
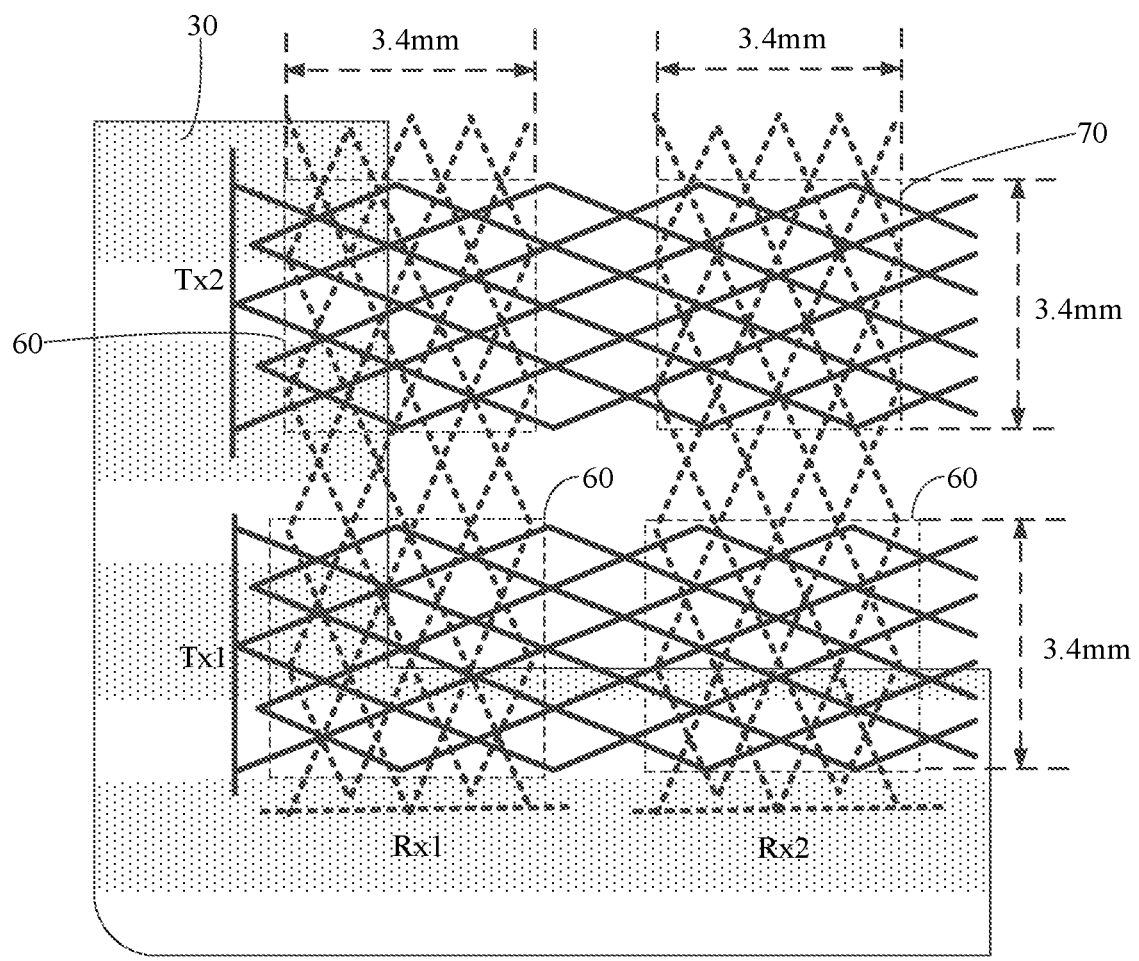
FIG. 1 is a schematic view showing a touch substrate according to one embodiment of the present disclosure.

FIG. 1 is a schematic view showing touch electrodes at a corner of a touch substrate in some embodiments of the present disclosure. FIG. 1 shows two groups of driving electrodes, e.g., Tx1 and Tx2, and two groups of sensing electrodes, e.g., Rx1 and Rx2. Illustratively, an active channel formed by each of Tx1 and Tx2 with each of Rx1 and Rx2 has a width of 3.4 mm. Orthogonal projections of the driving electrodes onto a base substrate overlap orthogonal projections of the sensing electrodes onto the base substrate at a plurality of overlapping regions. Some overlapping regions 60 overlap an orthogonal projection of a black matrix 30 onto the base substrate, and the other overlapping regions 70 do not overlap the orthogonal projection of the black matrix 30 onto the base substrate. When some overlapping regions 60 overlap the orthogonal projection of the black matrix 30 onto the base substrate, an electric field environment where the overlapping regions 60 are located is different from an electric field environment where the other overlapping regions 70 are located, so a capacitance generated at each overlapping region 60 is higher than a capacitance generated at each overlapping region 70, and thereby there is insufficient capacitance consistency between the peripheral channel and the in-plane channel of the touch substrate. During the test, an analog-to-digital conversion (ADC) value (a value acquired after performing analog-to-digital conversion on a signal from the sensing electrode) related to the capacitance exceeds a predetermined threshold, so the yield of the OGM touch panel may be adversely affected and a touch failure may easily occur during a process of manufacturing the touch substrate, especially in a reliability test of the touch substrate performed in a high-temperature and high-humidity environment.

As shown in FIGS. 2-4 and 8, the present disclosure provides in some embodiments a touch substrate, which includes a base substrate, a plurality of driving electrodes (e.g., Tx1 and Tx2) and a plurality of sensing electrodes (e.g., Rx1 and Rx2) arranged at different layers on the base substrate, and a black matrix 30 arranged at a peripheral region of the touch substrate. Orthogonal projections of the driving electrodes onto the base substrate overlap orthogonal projections of the sensing electrodes onto the base substrate at a plurality of first overlapping regions 10 and a plurality of second overlapping regions 20, an orthogonal projection of the black matrix 30 onto the base substrate overlaps each first overlapping region 10 and does not overlap each second overlapping region 20, and an effective area of the first overlapping region 10 is smaller than an effective area of the second overlapping region 20.

To be specific, the touch substrate may include a central region and the peripheral region. For example, the peripheral region may surround the central region. When the touch substrate is used in combination with a display panel, the central region may overlap a display region of the display panel, and the peripheral region may overlap a non-display region of the display panel.

The touch substrate may include the black matrix 30 arranged at the peripheral region, and the black matrix 30 may shield the peripheral region of the touch substrate.

The touch substrate may include the plurality of driving electrodes and the plurality of sensing electrodes arranged at different layers, and an insulation layer may be arranged between the driving electrodes and the sensing electrodes. Each driving electrode may extend in a direction different from the sensing electrode, and the orthogonal projection of each driving electrode onto the base substrate may cross the orthogonal projection of each sensing electrode onto the base substrate. For example, the driving electrodes and the sensing electrodes may each be a strip-like pattern or of a mesh-like structure, and at least a part of each of the driving electrodes and at least a part of each of the sensing electrodes may be covered by the black matrix 30.

For example, the touch substrate may include the plurality of driving electrodes arranged sequentially in a longitudinal direction, and each driving electrode may extend in a horizontal direction. The touch substrate may further include the plurality of sensing electrodes arranged sequentially in the horizontal direction, and each sensing electrode may extend in the longitudinal direction. The orthogonal projections of the driving electrodes onto the base substrate may overlap the orthogonal projections of the sensing electrodes onto the base substrate at the plurality of first overlapping regions 10 and the plurality of second overlapping regions 20. The orthogonal projection of the black matrix 30 onto the base substrate may overlap each first overlapping region 10 and may not overlap each second overlapping region 20. The effective area of each first overlapping region 10 may be smaller than the effective area of each second overlapping region 20.

It should be appreciated that, when each of the driving electrodes and the sensing electrodes is of the mesh-like structure, the effective area of each first overlapping region 10 may be a sum of areas of overlapping regions formed by orthogonal projections of mesh bars of the driving electrode onto the base substrate and orthogonal projections of mesh bars of the sensing electrode onto the base substrate in the first overlapping region 10, and the effective area of each second overlapping region 20 may be a sum of areas of overlapping regions formed by orthogonal projections of mesh bars of the driving electrode onto the base substrate and orthogonal projections of mesh bars of the sensing electrode onto the base substrate in the second overlapping region 20.

During the manufacture of the touch substrate, the black matrix 30 may be formed on the base substrate, a first insulation layer may be formed at a side of the black matrix 30 away from the base substrate, the plurality of sensing electrodes may be formed at a side of the first insulation layer away from the base substrate, then a second insulation layer may be formed at a side of the sensing electrodes away from the base substrate, and then the plurality of driving electrodes may be formed at a side of the second insulation layer away from the base substrate.

When the touch substrate is used in combination with the display panel, the touch substrate may be arranged at a light-exiting side of the display panel, and each of the driving electrodes and the sensing electrodes may be arranged between the base substrate and the display panel. In practical applications, a touch operation may be performed on the base substrate of the touch substrate through a finger.

Based on the specific structure of the touch substrate, the effective area of each first overlapping region 10 may be smaller than the effective area of each second overlapping region 20, so as to reduce an area of a portion of the driving electrode overlapping the sensing electrode at the first overlapping region 10, thereby to reduce a capacitance generated at the first overlapping region, and effectively reduce a difference between the capacitance generated at the first overlapping region 10 and a capacitance generated at the second overlapping region 20. Hence, according to the touch substrate in the embodiments of the present disclosure, it is able to improve the capacitance consistency between the peripheral channel and the in-plane channel of the touch substrate, thereby to fundamentally design the touch substrate in such a manner as to prevent the yield of a touch panel from being adversely affected and prevent the occurrence of a touch failure.

As shown in FIGS. 2 to 7, in some embodiments of the present disclosure, each driving electrode is of a mesh-like structure, and the driving electrodes include first central driving electrodes 40 and first peripheral driving electrodes 41. An orthogonal projection of each first central driving electrode 40 onto the base substrate does not overlap the orthogonal projection of the black matrix 30 onto the base substrate, an orthogonal projection of each first peripheral driving electrode 41 onto the base substrate is located within the orthogonal projection of the black matrix 30 onto the base substrate, and a mesh density of each first peripheral driving electrode 41 is smaller than a mesh density of each first central driving electrode 40.

In some embodiments of the present disclosure, each sensing electrode is of a mesh-like structure, and the sensing electrodes include first central sensing electrodes 50 and first peripheral sensing electrodes 51. An orthogonal projection of each first central sensing electrode 50 onto the base substrate does not overlap the orthogonal projection of the black matrix 30 onto the base substrate, an orthogonal projection of each first peripheral sensing electrode 51 onto the base substrate is located within the orthogonal projection of the black matrix 30 onto the base substrate, and a mesh density of each first peripheral sensing electrode 51 is smaller than a mesh density of each first central sensing electrode 50.

Figure 2:
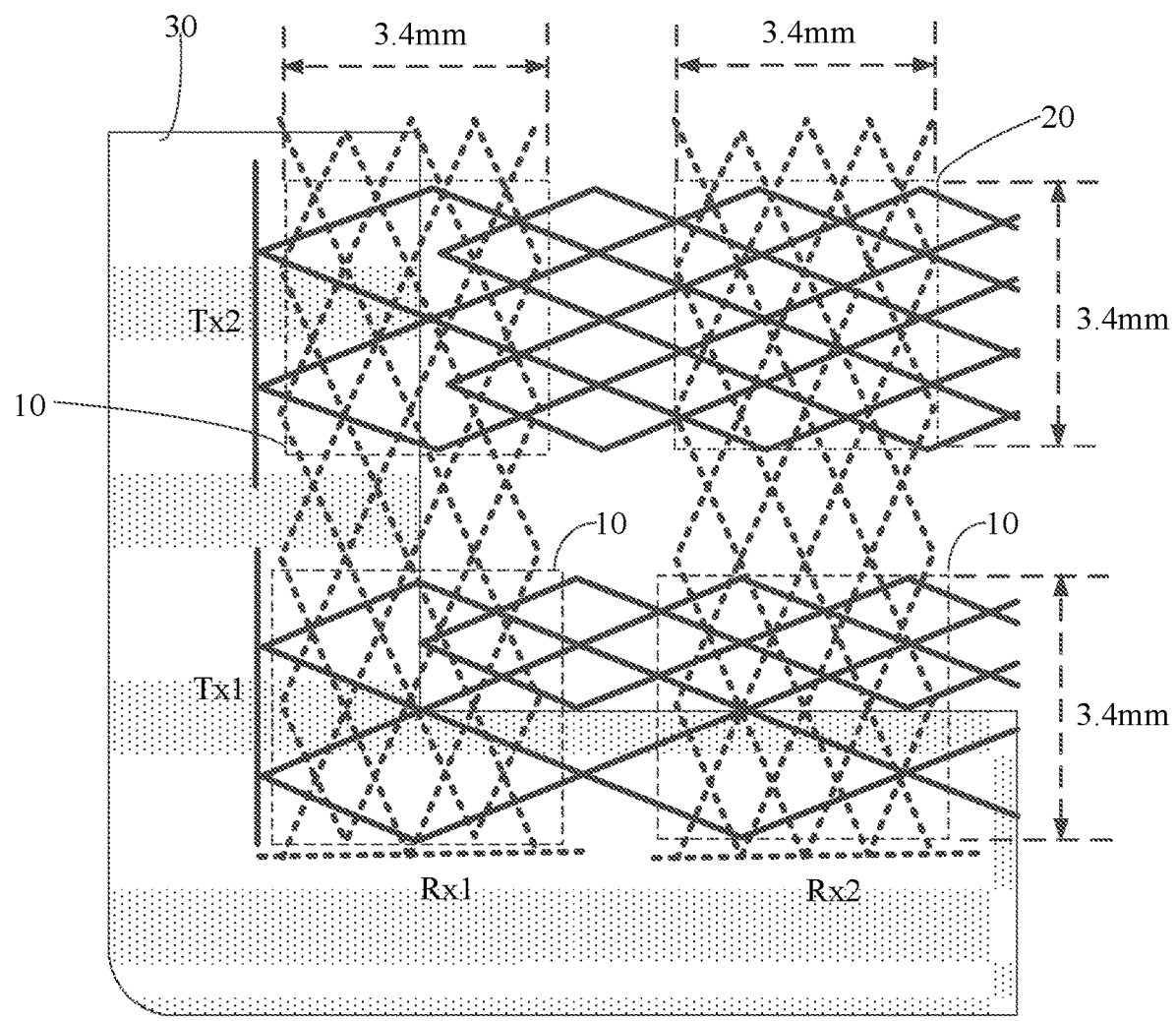
FIG. 2 is another schematic view showing the touch substrate according to one embodiment of the present disclosure.
Figure 4:
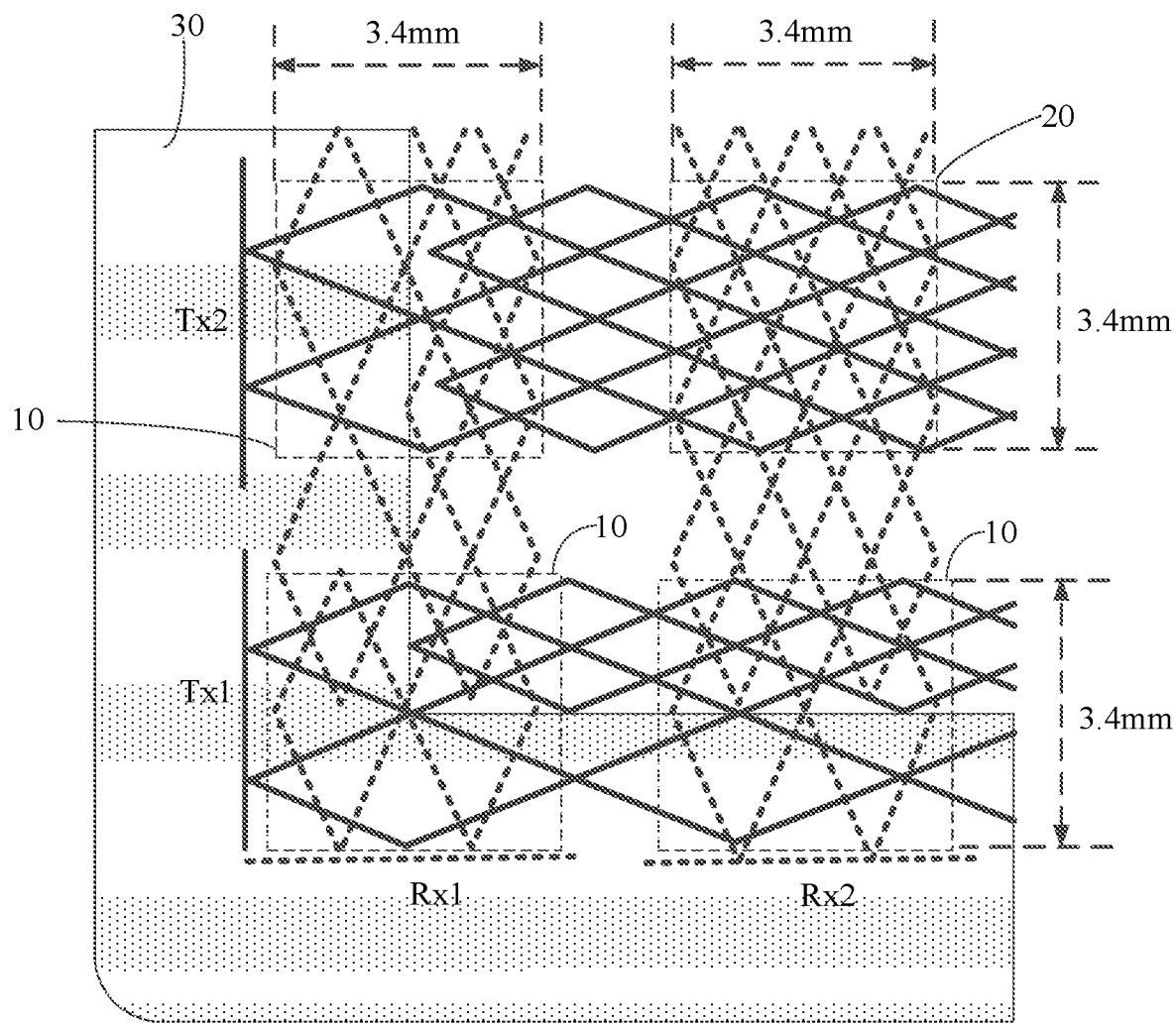
FIG. 4 is still yet another schematic view showing the touch substrate according to one embodiment of the present disclosure.
Figure 5:
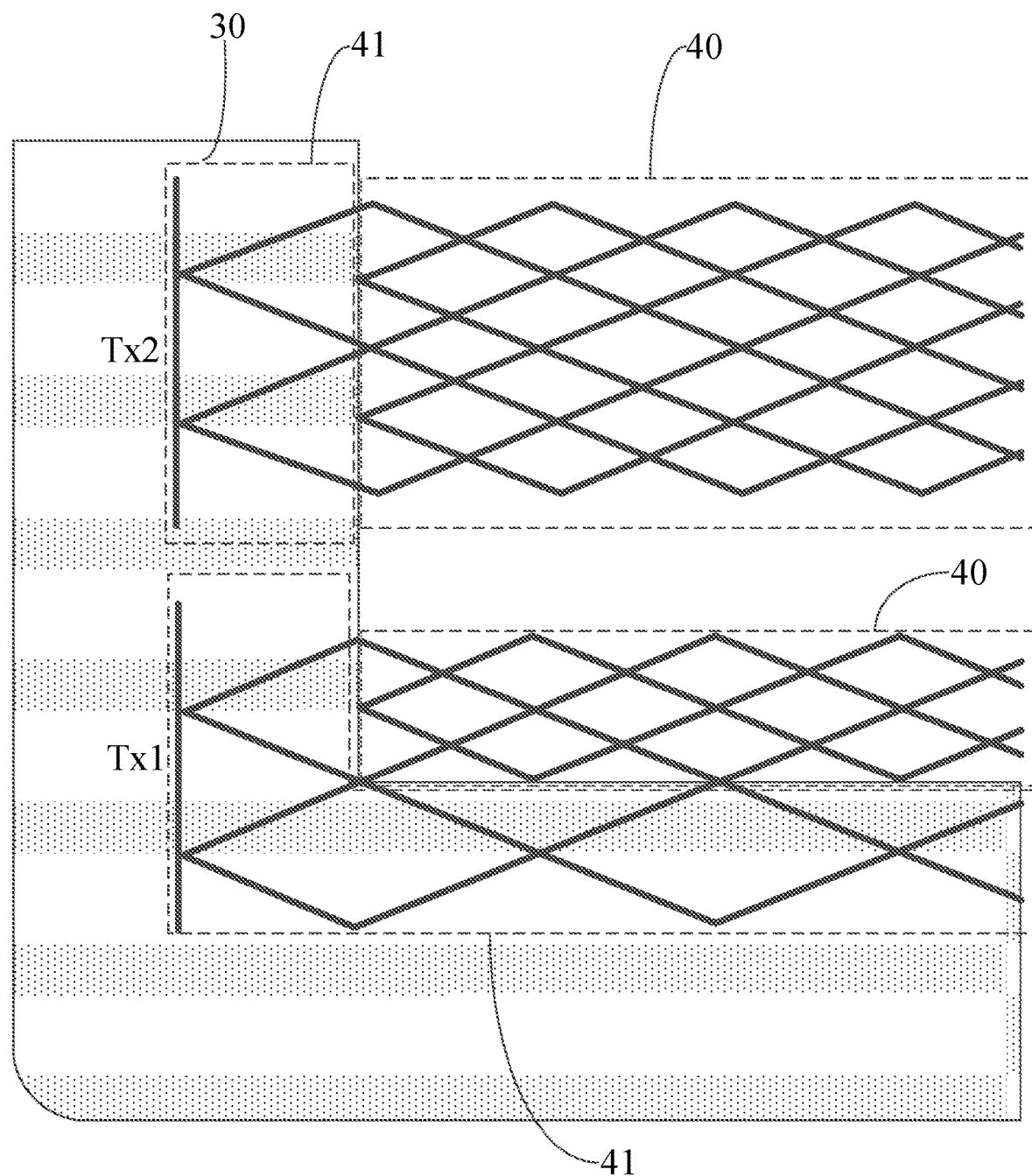
FIG. 5 is a schematic view showing a driving electrode and a black matrix in FIG. 4.

To be specific, as shown in FIGS. 2 and 4, each driving electrode is of the mesh-like structure, and the mesh is of a diamond shape. As shown in FIG. 5, the driving electrodes include the first central driving electrodes 40 and the first peripheral driving electrodes 41, the orthogonal projection of each first peripheral driving electrode 41 onto the base substrate partially overlaps the first overlapping region 10, and the orthogonal projection of each first central driving electrode 40 onto the base substrate does not overlap the first overlapping region 10.

When the mesh density of the first peripheral driving electrode 41 is smaller than the mesh density of the first central driving electrode 40, the effective area of each first overlapping region 10 may be smaller than the effective area of each second overlapping region 20, i.e., a sum of areas of overlapping regions formed by orthogonal projections of mesh bars of the first peripheral driving electrode 41 onto the base substrate and orthogonal projections of mesh bars of the sensing electrode (or the first peripheral sensing electrode) onto the base substrate at the first overlapping region 10 may be smaller than a sum of areas of overlapping regions formed by orthogonal projections of mesh bars of the first central driving electrode 40 onto the base substrate and orthogonal projections of mesh bars of the sensing electrode (or the first central sensing electrode) onto the base substrate at the second overlapping region 20. In this way, it is able to reduce the capacitance generated at the first overlapping region 10 and effectively reduce the difference between the capacitance generated at the first overlapping region 10 and the capacitance generated at the second overlapping region 20, thereby to improve the capacitance consistency between the peripheral channel and the in-plane channel of the touch substrate, and fundamentally design the touch substrate in such a manner as to prevent the yield of the touch panel from being adversely affected and prevent the occurrence of a touch failure.

Figure 3:
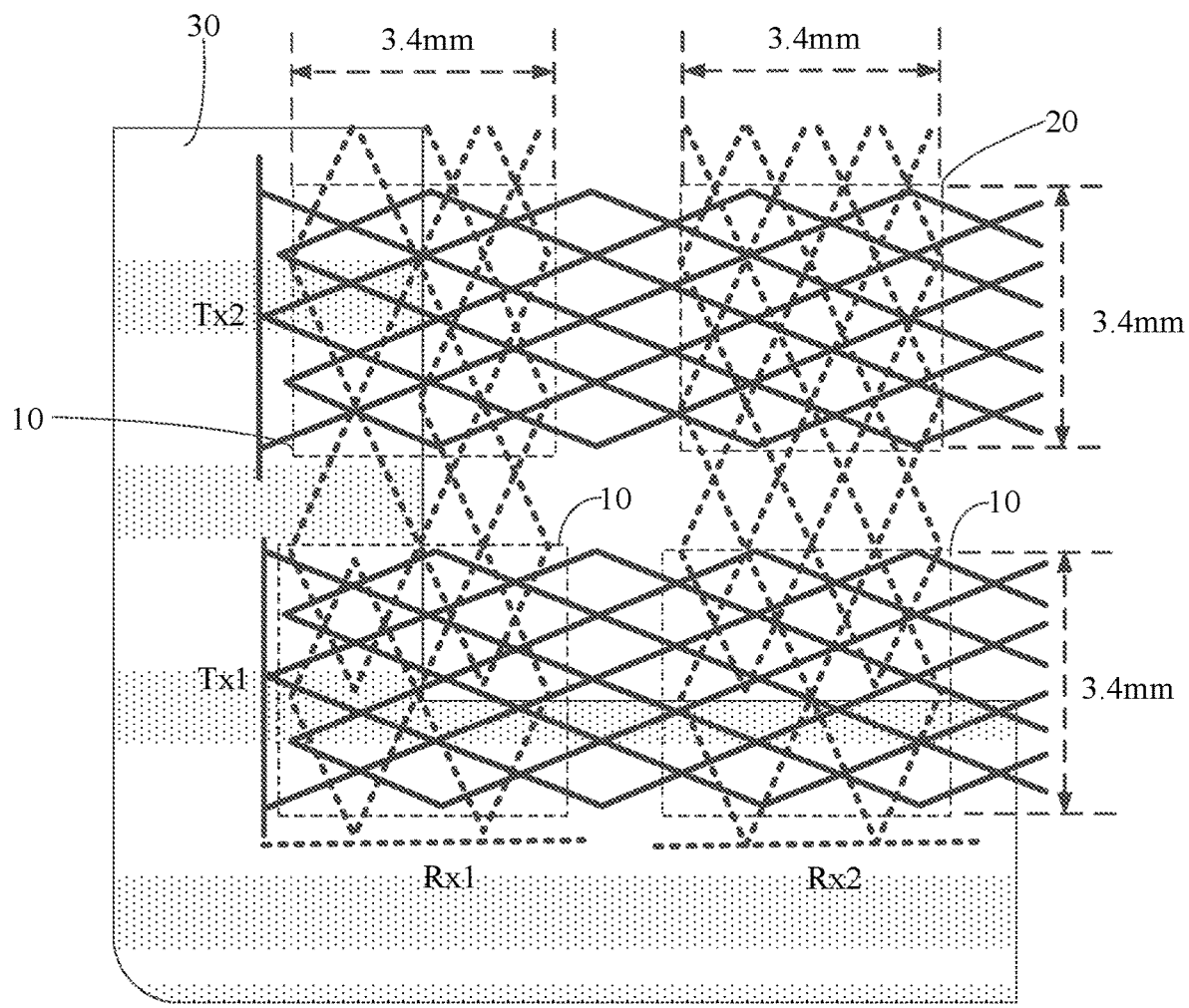
FIG. 3 is yet another schematic view showing the touch substrate according to one embodiment of the present disclosure.
Figure 7:
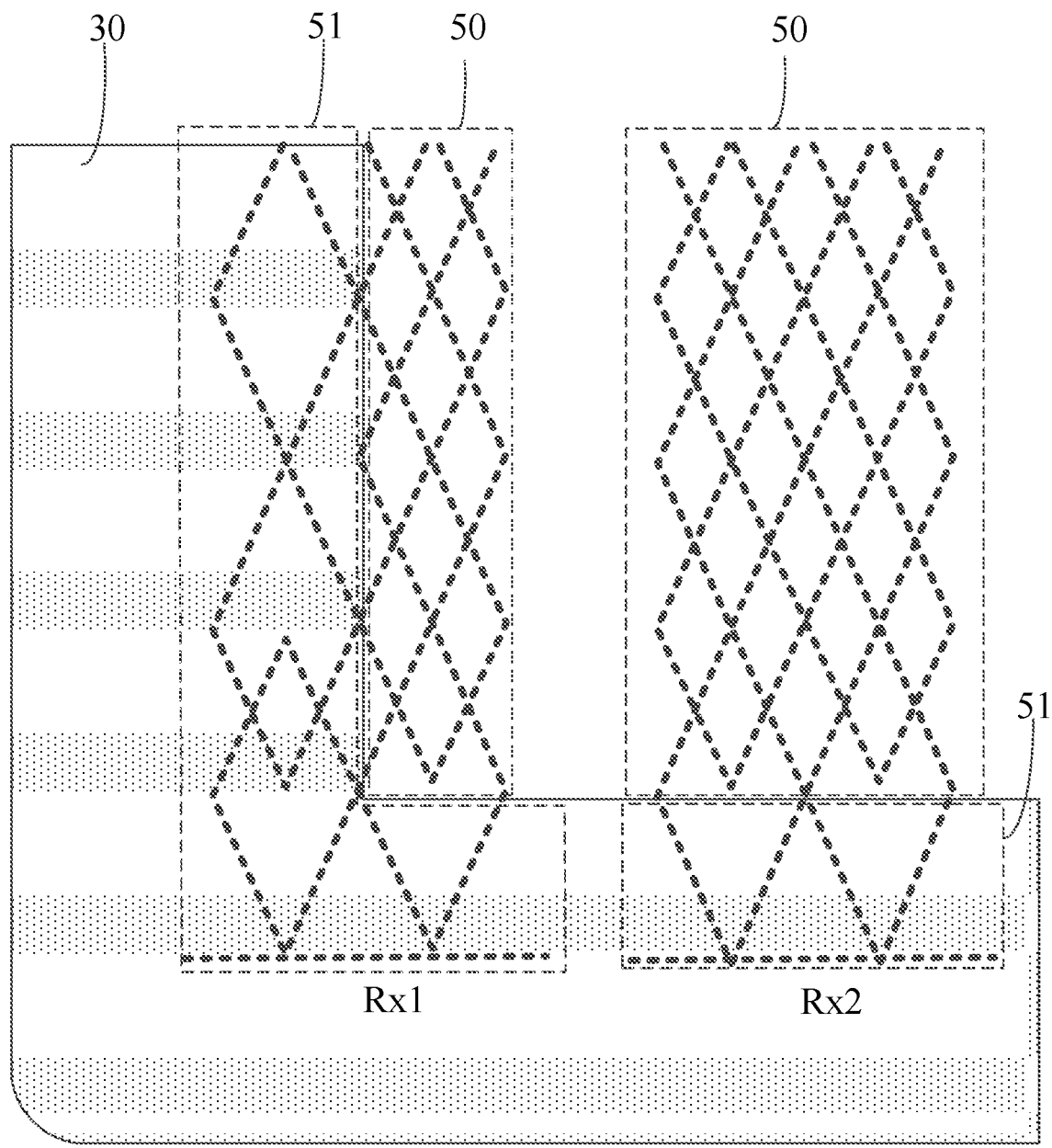
FIG. 7 is a schematic view showing a sensing electrode and the black matrix in FIG. 4.

As shown in FIGS. 3 and 4, each sensing electrode is of the mesh-like structure, and the mesh is of a diamond shape. As shown in FIG. 7, the sensing electrodes include the first central sensing electrodes 50 and the first peripheral sensing electrodes 51, the orthogonal projection of each first peripheral sensing electrode 51 onto the base substrate partially overlaps the first overlapping region 10, and the orthogonal projection of each first central sensing electrode 50 onto the base substrate does not overlap the first overlapping region 10.

When the mesh density of the first peripheral sensing electrode 51 is smaller than the mesh density of the first central sensing electrode 50, the effective area of each first overlapping region 10 may be smaller than the effective area of each second overlapping region 20, i.e., a sum of areas of overlapping regions formed by orthogonal projections of mesh bars of the first peripheral sensing electrode 51 onto the base substrate and orthogonal projections of mesh bars of the driving electrode (or the first peripheral driving electrode 41) onto the base substrate at the first overlapping region 10 may be smaller than a sum of areas of overlapping regions formed by orthogonal projections of mesh bars of the first central sensing electrode 50 onto the base substrate and orthogonal projections of mesh bars of the driving electrode (or the first central driving electrode 50) onto the base substrate at the second overlapping region 20. In this way, it is able to reduce the capacitance generated at the first overlapping region 10 and effectively reduce the difference between the capacitance generated at the first overlapping region 10 and the capacitance generated at the second overlapping region 20, thereby to improve the capacitance consistency between the peripheral channel and the in-plane channel of the touch substrate, and fundamentally design the touch substrate in such a manner as to prevent the yield of the touch panel from being adversely affected and prevent the occurrence of a touch failure.

Figure 6:
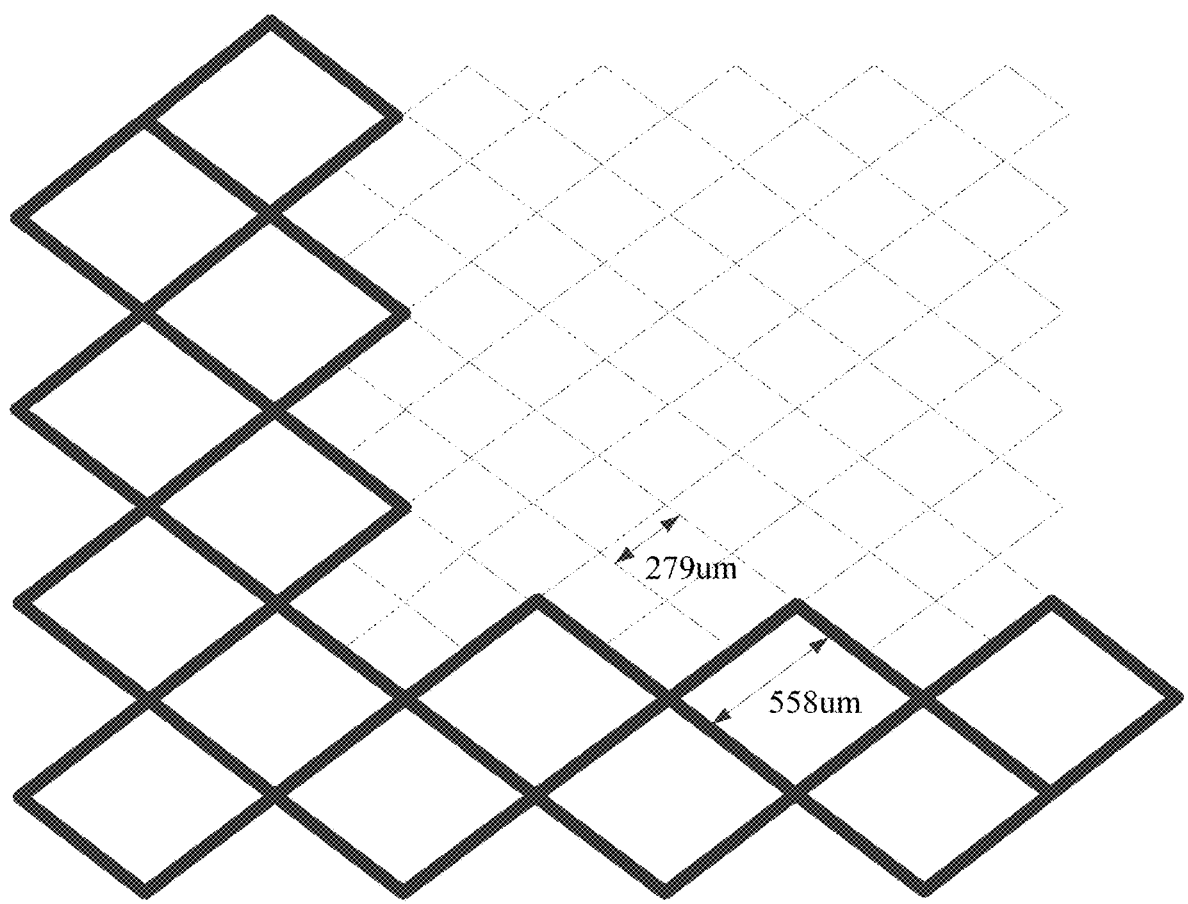
FIG. 6 is a schematic view showing a mesh density of each first peripheral driving electrode and a mesh density of each first central driving electrode according to one embodiment of the present disclosure.

As shown in FIG. 6, in some embodiments of the present disclosure, the mesh density of each first peripheral driving electrode 41 may be half of the mesh density of each first central driving electrode 40, and/or the mesh density of each first peripheral sensing electrode 51 may be half of the mesh density of each first central sensing electrode 50.

To be specific, FIG. 6 shows a difference between the mesh density of each first peripheral diving electrode 41 and the mesh density of each first central driving electrode 40 in the driving electrodes. For example, a mesh in the first peripheral driving electrode 41 may have a width of 558 μm, and a mesh in the first central driving electrode 40 may have a width of 279 μm.

Through the above arrangement, it is able to reduce the capacitance generated at the first overlapping region 10 and effectively reduce the difference between the capacitance generated at the first overlapping region 10 and the capacitance generated at the second overlapping region 20, thereby to improve the capacitance consistency between the peripheral channel and the in-plane channel of the touch substrate, and fundamentally design the touch substrate in such a manner as to prevent the yield of the touch panel from being adversely affected and prevent the occurrence of a touch failure.

Figure 8:
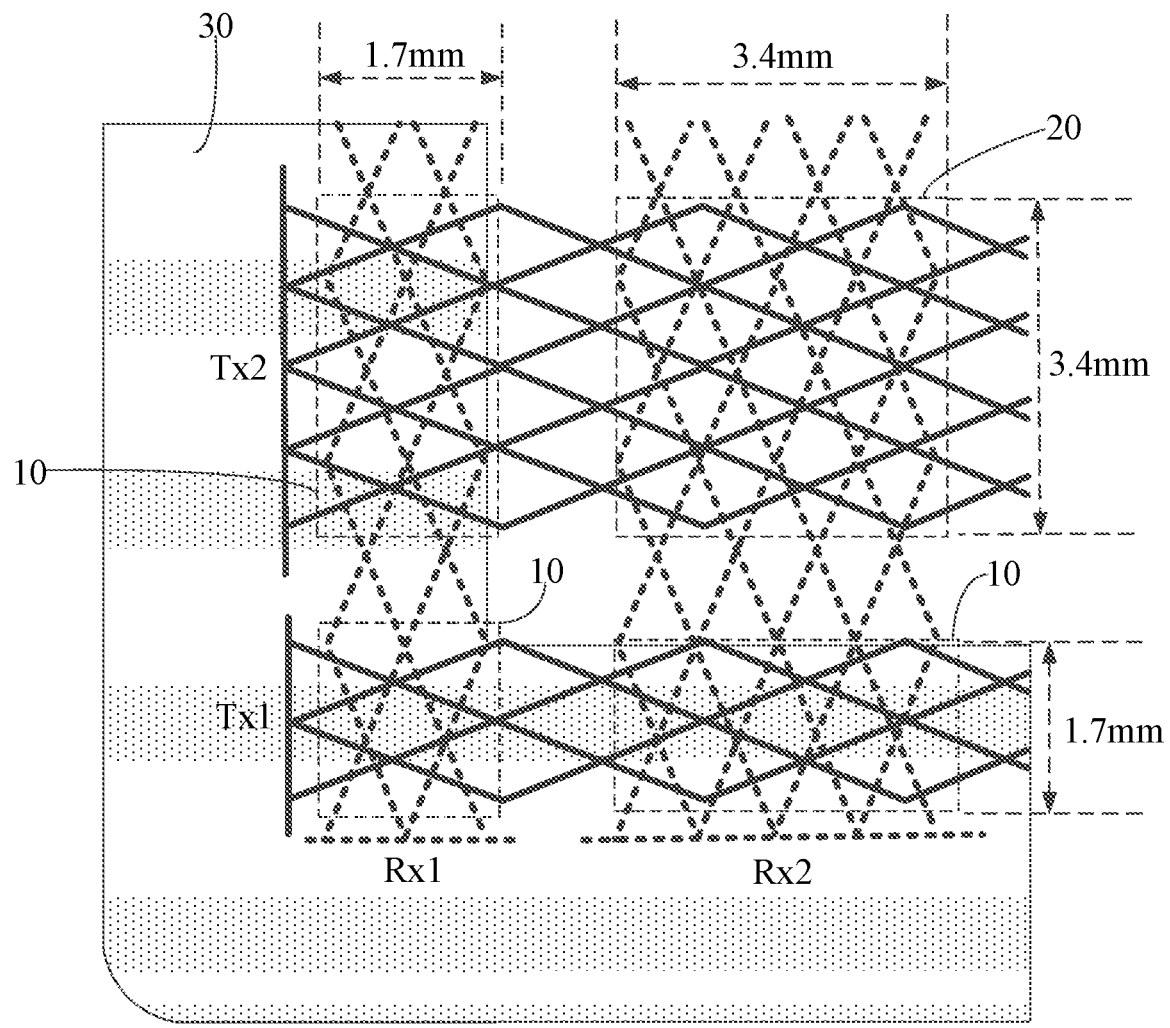
FIG. 8 is still yet another schematic view showing the touch substrate according to one embodiment of the present disclosure.
Figure 9:
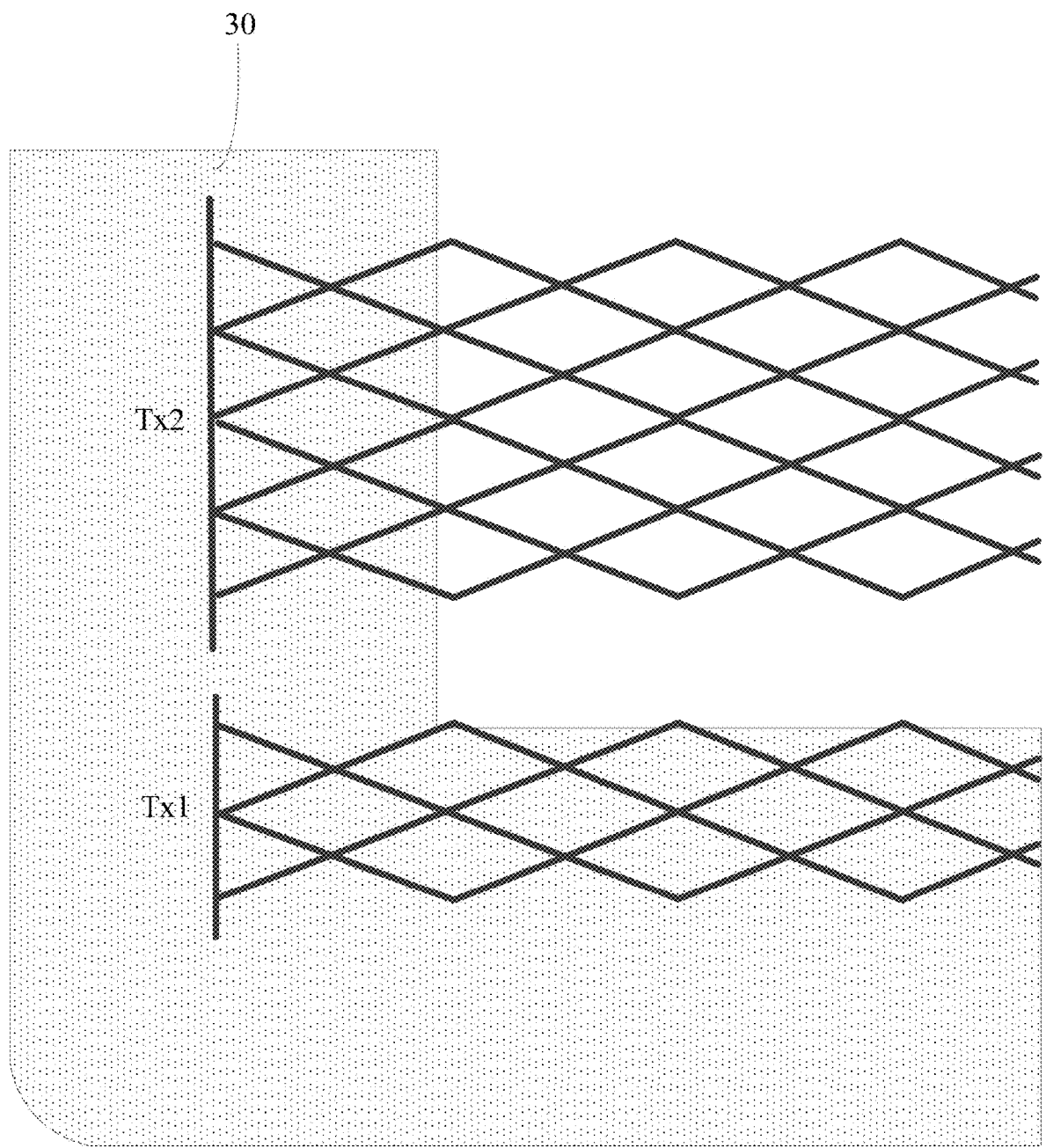
FIG. 9 is a schematic view showing a driving electrode and a black matrix in FIG. 8.
Figure 10:
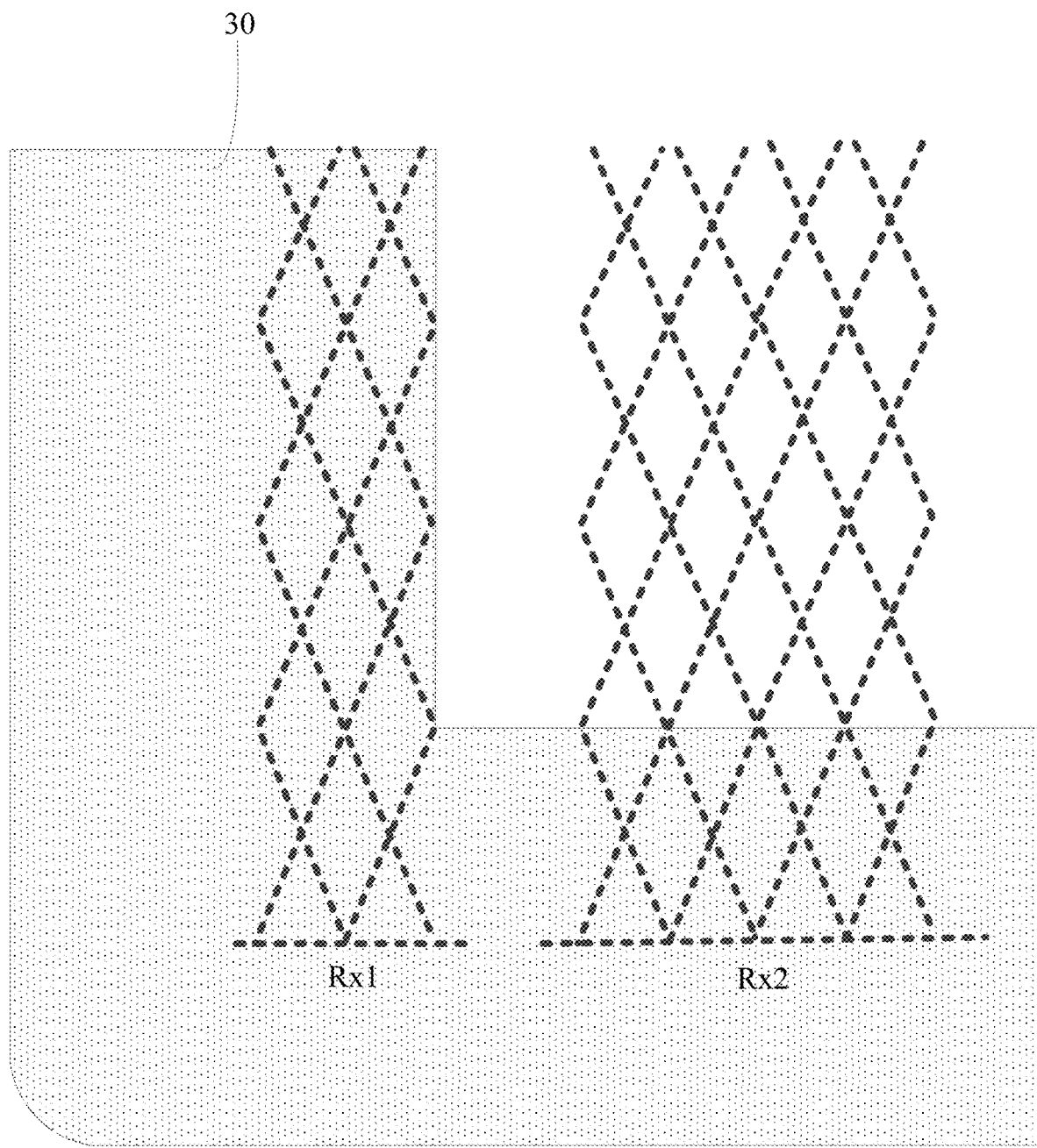
FIG. 10 is a schematic view showing a sensing electrode and the black matrix in FIG. 8.

As shown in FIGS. 8 to 10, in some embodiments of the present disclosure, the driving electrodes extend in a first direction and include second central driving electrodes and second peripheral driving electrodes. An orthogonal projection of each second central driving electrode onto the base substrate partially overlaps the orthogonal projection of the black matrix 30 onto the base substrate, an orthogonal projection of each second peripheral driving electrode onto the base substrate is located within the orthogonal projection of the black matrix 30 onto the base substrate, and a maximum width of each second peripheral driving electrode is smaller than a maximum width of each second central driving electrode in a direction perpendicular to the first direction.

In some embodiments of the present disclosure, the sensing electrodes extend in a second direction and include second central sensing electrodes and second peripheral sensing electrodes, an orthogonal projection of each second central sensing electrode onto the base substrate partially overlaps the orthogonal projection of the black matrix 30 onto the base substrate, an orthogonal projection of each second peripheral sensing electrode onto the base substrate is located within the orthogonal projection of the black matrix 30 onto the base substrate, and a maximum width of each second peripheral sensing electrode is smaller than a maximum width of each second central sensing electrode in a direction perpendicular to the second direction.

Figure 11:
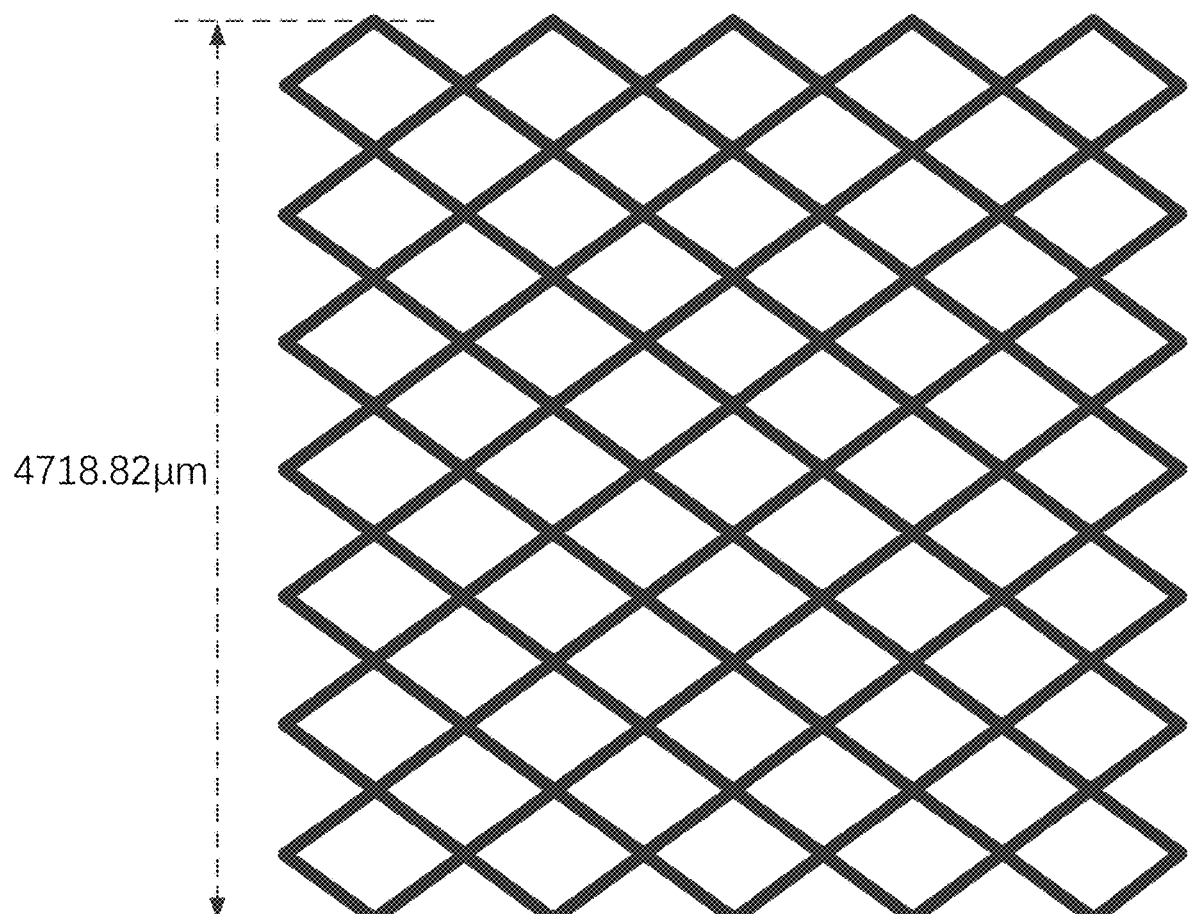
FIG. 11 is a schematic view showing a width of a second central driving electrode according to one embodiment of the present disclosure.
Figure 12:
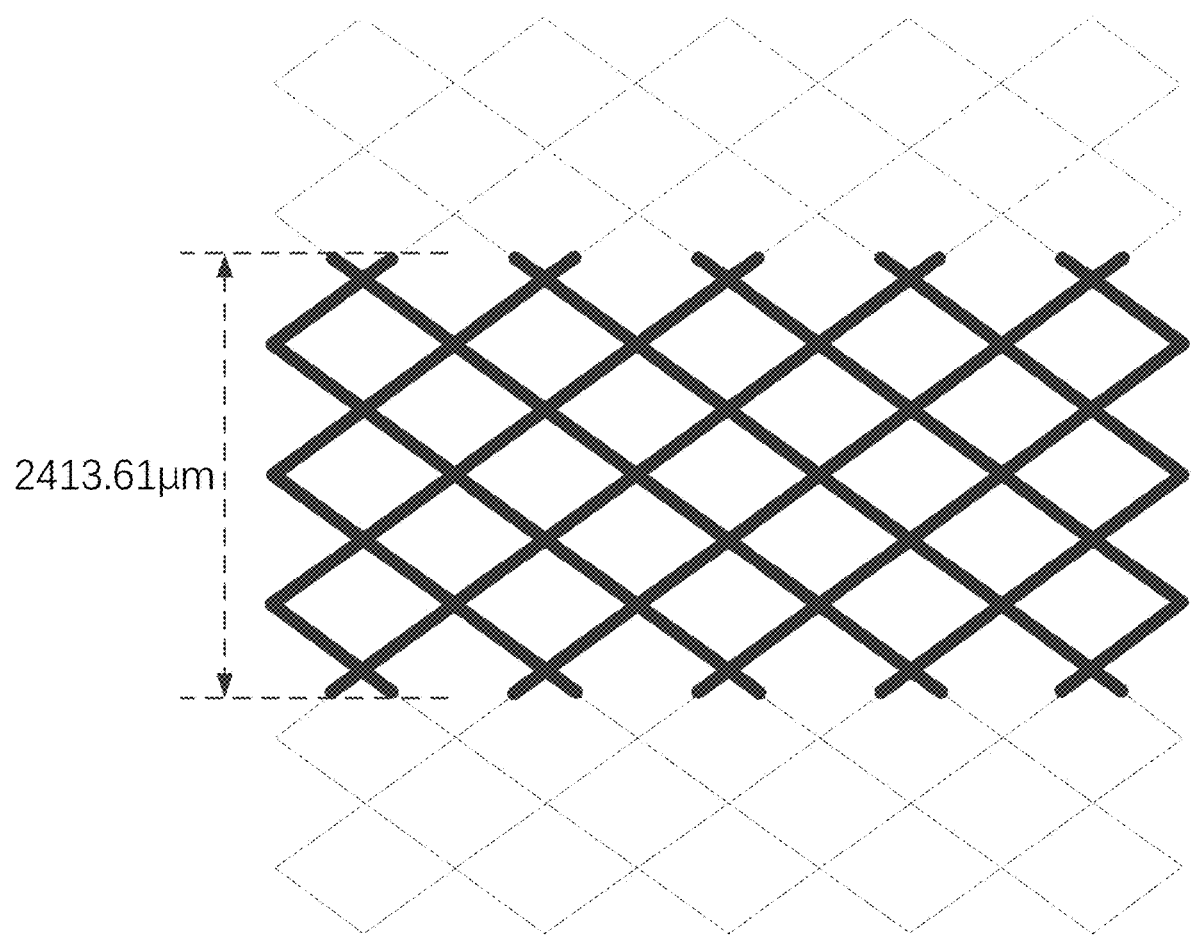
FIG. 12 is a schematic view showing a width of a second peripheral driving electrode according to one embodiment of the present disclosure.

To be specific, as shown in FIG. 9, Tx2 represents the second central driving electrode, and Tx1 represents the second peripheral driving electrode. For example, the first direction may be a horizontal direction, and the maximum width of the second peripheral driving electrode may be smaller than the maximum width of the second central driving electrode in the direction perpendicular to the first direction. As shown in FIGS. 11 and 12, for example, an active channel formed by the second central driving electrode has a width of 4718.28 μm, and an active channel formed by the second peripheral driving electrode has a width of 2413.61 μm. It should be appreciated that, a dotted mesh in FIG. 12 represents a second dummy electrode.

When the maximum width of the second peripheral driving electrode is smaller than the maximum width of the second central driving electrode in the direction perpendicular to the first direction, an area of the first overlapping region 10 (1.7 mm*3.4 mm or 1.7 mm*1.7 mm) may be smaller than an area of the second overlapping region 20 (3.4 mm*3.4 mm), so the effective area of the first overlapping region 10 may also be smaller than the effective area of the second overlapping region 20, i.e., a sum of areas of overlapping regions formed by orthogonal projections of mesh bars of the second peripheral driving electrode onto the base substrate and orthogonal projections of mesh bars of the sensing electrode (or the second peripheral sensing electrode) onto the base substrate at the first overlapping region 10 may be smaller than a sum of areas of overlapping regions formed by orthogonal projections of mesh bars of the second central driving electrode onto the base substrate and orthogonal projections of mesh bars of the sensing electrode (or the second central sensing electrode) onto the base substrate at the second overlapping region 20. In this way, it is able to reduce the capacitance generated at the first overlapping region 10 and effectively reduce the difference between the capacitance generated at the first overlapping region 10 and the capacitance generated at the second overlapping region 20, thereby to improve the capacitance consistency between the peripheral channel and the in-plane channel of the touch substrate, and fundamentally design the touch substrate in such a manner as to prevent the yield of the touch panel from being adversely affected and prevent the occurrence of a touch failure.

As shown in FIG. 10, Rx2 represents the second central sensing electrode, and Rx1 represents the second peripheral sensing electrode. For example, the second direction may be a longitudinal direction, and the maximum width of the second peripheral sensing electrode may be smaller than the maximum width of the second central sensing electrode in the direction perpendicular to the second direction.

When the maximum width of the second peripheral sensing electrode is smaller than the maximum width of the second central sensing electrode in the direction perpendicular to the second direction, an area of the first overlapping region 10 (1.7 mm*3.4 mm or 1.7 mm*1.7 mm) may be smaller than an area of the second overlapping region 20 (3.4 mm*3.4 mm), so the effective area of the first overlapping region 10 may also be smaller than the effective area of the second overlapping region 20, i.e., a sum of areas of overlapping regions formed by orthogonal projections of mesh bars of the second peripheral sensing electrode onto the base substrate and orthogonal projections of mesh bars of the driving electrode (or the second peripheral driving electrode) onto the base substrate at the first overlapping region 10 may be smaller than a sum of areas of overlapping regions formed by orthogonal projections of mesh bars of the second central sensing electrode onto the base substrate and orthogonal projections of mesh bars of the driving electrode (or the second central driving electrode) onto the base substrate at the second overlapping region 20. In this way, it is able to reduce the capacitance generated at the first overlapping region 10 and effectively reduce the difference between the capacitance generated at the first overlapping region 10 and the capacitance generated at the second overlapping region 20, thereby to improve the capacitance consistency between the peripheral channel and the in-plane channel of the touch substrate, and fundamentally design the touch substrate in such a manner as to prevent the yield of the touch panel from being adversely affected and prevent the occurrence of a touch failure.

In some embodiments of the present disclosure, the maximum width of the second peripheral driving electrode may be half of the maximum width of the second central driving electrode in the direction perpendicular to the first direction.

In some embodiments of the present disclosure, the maximum width of the second peripheral sensing electrode may be half of the maximum width of the second central sensing electrode in the direction perpendicular to the second direction.

As shown in FIG. 8, for example, an active channel formed by the second peripheral driving electrode Tx1 has a width of 1.7 mm and an active channel formed by the second central driving electrode Tx2 has a width of 3.4 mm in the direction perpendicular to the first direction.

As shown in FIG. 8, for example, an active channel formed by the second peripheral sensing electrode Rx1 has a width of 1.7 mm and an active channel formed by the second central sensing electrode Rx2 has a width of 3.4 mm in the direction perpendicular to the second direction.

Through the above-mentioned arrangement, it is able to reduce the capacitance generated at the first overlapping region 10 and effectively reduce the difference between the capacitance generated at the first overlapping region 10 and the capacitance generated at the second overlapping region 20, thereby to improve the capacitance consistency between the peripheral channel and the in-plane channel of the touch substrate, and fundamentally design the touch substrate in such a manner as to prevent the yield of the touch panel from being adversely affected and prevent the occurrence of a touch failure.

It should be appreciated that, the schemes in FIGS. 9 and 10 may be implemented separately or in a combined manner. When the schemes in FIGS. 9 and 10 are implemented separately, merely the width of the second peripheral driving electrode or the second peripheral sensing electrode may be reduced, and when the schemes are implemented in a combined manner, both the widths of the second peripheral driving electrode and the second peripheral sensing electrode may be reduced.

In some embodiments of the present disclosure, the touch substrate may further include: a plurality of first dummy electrodes arranged at a same layer as the plurality of sensing electrodes, each first dummy electrode being of a same structure as the sensing electrode and being insulated from the corresponding sensing electrode; and a plurality of second dummy electrodes arranged at a same layer as the plurality of driving electrodes, each second dummy electrode being of a same structure as the driving electrode and being insulated from the corresponding driving electrode.

To be specific, the touch substrate may further include the plurality of first dummy electrodes arranged at the same layer as the plurality of sensing electrodes. For example, each first dummy electrode may extend in the second direction, and the first dummy electrodes and the sensing electrodes may be arranged alternately in the first direction. The first dummy electrodes and the sensing electrodes may be formed simultaneously in a single patterning process, and each first dummy electrode may be spaced apart from the sensing electrode by a certain distance, so that the first dummy electrode is insulated from the sensing electrode. No electric signal may be applied to the first dummy electrode.

The touch substrate may further include the plurality of second dummy electrodes arranged at the same layer as the plurality of driving electrodes. For example, each second dummy electrode may extend in the first direction, and the second dummy electrodes and the driving electrodes may be arranged alternately in the second direction. The second dummy electrodes and the driving electrodes may be formed simultaneously in a single patterning process, and each second dummy electrode may be spaced apart from the driving electrode by a certain distance, so that the second dummy electrode is insulated from the driving electrode. No electric signal may be applied to the second dummy electrode.

According to the touch substrate in the embodiments of the present disclosure, through the first dummy electrodes and the second dummy electrodes, the mesh-like structure may be distributed evenly on the touch substrate. When the touch substrate is used in combination with the display panel, it is able to improve the light uniformity at the light-existing side of the display panel.

In some embodiments of the present disclosure, the touch substrate may further include an insulation layer arranged between the sensing electrode and the driving electrode.

To be specific, through the insulation layer between the sensing electrode and the driving electrode, it is able to form a capacitive structure between the driving electrode and the sensing electrode overlapping each other while preventing the occurrence of a short circuit therebetween, thereby to enable the touch substrate to achieve a normal touch function.

In some embodiments of the present disclosure, the sensing electrode may be arranged between the driving electrode and the base substrate.

To be specific, in the case that the sensing electrode is arranged between the driving electrode and the base substrate, when the touch substrate is used in combination with the display panel, the sensing electrode and the base substrate of the touch substrate may be arranged at a side away from the display panel, so as to enable the sensing electrode to be closer to a user's finger, thereby to improve the touch performance.

Figure 13:
FIG. 13 is a side view of a touch display device according to one embodiment of the present disclosure.

As shown in FIG. 13, the present disclosure further provides in some embodiments a touch display device, which includes the above-mentioned touch substrate and a display panel. The touch substrate is arranged at a light-exiting side of the display panel, and an orthogonal projection of the peripheral region 81 of the touch substrate onto the display panel overlaps a non-display region 91 of the display panel.

To be specific, when the touch substrate is used in combination with the display panel, the touch substrate may be arranged at the light-exiting side of the display panel, and the driving electrodes and the sensing electrodes may be arranged between the base substrate and the display panel. The orthogonal projection of the peripheral region 81 of the touch substrate onto the display panel may overlap the non-display region 91 of the display panel, and an orthogonal projection of a central region 80 of the touch substrate onto the display panel may overlap a display region 90 of the display panel. In practical applications, the touch display device may achieve a touch function and a display function simultaneously.

In the touch substrate, the effective area of each first overlapping region 10 may be smaller than the effective area of each second overlapping region 20, so as to reduce the area of the portion of the driving electrode overlapping the sensing electrode at the first overlapping region 10, thereby to reduce the capacitance generated at the first overlapping region, and effectively reduce the difference between the capacitance generated at the first overlapping region 10 and the capacitance generated at the second overlapping region 20. Hence, according to the touch substrate in the embodiments of the present disclosure, it is able to improve the capacitance consistency between the peripheral channel and the in-plane channel of the touch substrate, thereby to fundamentally design the touch substrate in such a manner as to prevent the yield of the touch panel from being adversely affected and prevent the occurrence of a touch failure.

When the touch display device includes the touch substrate, it may also have the above-mentioned beneficial effect, which will not be particularly defined herein.

It should be appreciated that, the touch display device may be any product or member having a display function, e.g., a television, a display, a digital photo frame, a mobile phone or a tablet computer.

In some embodiments of the present disclosure, the driving electrodes and the sensing electrodes of the touch substrate may be arranged between the display panel and the base substrate of the touch substrate.

To be specific, in the case that the sensing electrode is arranged between the driving electrode and the base substrate, when the touch substrate is used in combination with the display panel, the sensing electrode and the base substrate of the touch substrate may be arranged at the side away from the display panel. In this way, when the touch display device is used, a touch operation may be performed by a user at a side where the base substrate of the touch substrate is located, so as to enable the sensing electrode to be closer to a user's finger, thereby to improve the touch performance.

The present disclosure further provides in some embodiments a method for manufacturing the above-mentioned touch substrate, which includes: forming a black matrix 30 on a base substrate, the black matrix 30 being arranged at the peripheral region of the touch substrate; and forming a plurality of driving electrodes and a plurality of sensing electrodes at different layers on the base substrate. Orthogonal projections of the driving electrodes onto the base substrate overlap orthogonal projections of the sensing electrodes onto the base substrate at a plurality of first overlapping regions 10 and a plurality of second overlapping regions 20, an orthogonal projection of the black matrix 30 onto the base substrate overlaps each first overlapping region 10 and does not overlap each second overlapping region 20, and an effective area of the first overlapping region 10 is smaller than an effective area of the second overlapping region 20.

In the touch substrate manufactured through the above-mentioned method in the embodiments of the present disclosure, the effective area of each first overlapping region 10 may be smaller than the effective area of each second overlapping region 20, so as to reduce the area of the portion of the driving electrode overlapping the sensing electrode at the first overlapping region 10, thereby to reduce the capacitance generated at the first overlapping region, and effectively reduce the difference between the capacitance generated at the first overlapping region 10 and the capacitance generated at the second overlapping region 20. Hence, according to the touch substrate manufactured through the above-mentioned method in the embodiments of the present disclosure, it is able to improve the capacitance consistency between the peripheral channel and the in-plane channel of the touch substrate, thereby to fundamentally design the touch substrate in such a manner as to prevent the yield of the touch panel from being adversely affected and prevent the occurrence of a touch failure.

In some embodiments of the present disclosure, the forming the plurality of sensing electrodes on the base substrate may specifically include: forming a first conductive thin film on the base substrate; and patterning the first conductive thin film to form the sensing electrodes and first dummy electrodes each of a mesh-like structure.

To be specific, a conductive material may be applied onto the base substrate to form the first conductive thin film. Next, a photoresist layer may be formed at a side of the first conductive thin film away from the base substrate, and then exposed and developed to form a photoresist reserved region corresponding to a region where the sensing electrodes and the first dummy electrodes are located and a photoresist unreserved region corresponding to the other region. Then, the first conductive thin film at the photoresist unreserved region may be etched off, and the remaining photoresist layer may be removed, so as to form the sensing electrodes and the first dummy electrodes each of a mesh-like structure.

When the sensing electrodes and the first dummy electrodes are formed as mentioned hereinabove, it is able to fundamentally design the touch substrate in such a manner as to prevent the yield of the touch panel from being adversely affected and prevent the occurrence of a touch failure without any additional process or manufacture cost.

In some embodiments of the present disclosure, the forming the plurality of driving electrodes on the base substrate may specifically include: forming an insulation layer at a side of each sensing electrode away from the base substrate; forming a second conductive thin film at a side of the insulation layer away from the base substrate; and patterning the second conductive thin film to form the driving electrodes and second dummy electrodes each of a mesh-like structure.

To be specific, a conductive material may be applied onto a side of the insulation layer away from the base substrate to form the second conductive thin film. Next, a photoresist layer may be formed at a side of the second conductive thin film away from the base substrate, and then exposed and developed to form a photoresist reserved region corresponding to a region where the driving electrodes and the second dummy electrodes are located and a photoresist unreserved region corresponding to the other region. Then, the second conductive thin film at the photoresist unreserved region may be etched off, and the remaining photoresist layer may be removed, so as to form the driving electrodes and the second dummy electrodes each of a mesh-like structure.

When the driving electrodes and the second dummy electrodes are formed as mentioned hereinabove, it is able to fundamentally design the touch substrate in such a manner as to prevent the yield of the touch panel from being adversely affected and prevent the occurrence of a touch failure without any additional process or manufacture cost.

It should be further appreciated that, the above embodiments have been described in a progressive manner, and the same or similar contents in the embodiments have not been repeated, i.e., each embodiment has merely focused on the difference from the others. Especially, the product embodiments are substantially similar to the method embodiments, and thus have been described in a simple manner.

Unless otherwise defined, any technical or scientific term used herein shall have the common meaning understood by a person of ordinary skills. Such words as "first" and "second" used in the specification and claims are merely used to differentiate different components rather than to represent any order, number or importance. Such words as "include" or "including" intends to indicate that an element or object before the word contains the element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure. The scope of the present disclosure shall be subject to the scope defined by the appended claims.

What is claimed is:

1. A touch substrate, comprising a base substrate, a plurality of driving electrodes and a plurality of sensing electrodes arranged at different layers on the base substrate, and a black matrix arranged at a peripheral region of the touch substrate, wherein orthogonal projections of the driving electrodes onto the base substrate overlap orthogonal projections of the sensing electrodes onto the base substrate at a plurality of first overlapping regions and a plurality of second overlapping regions, an orthogonal projection of the black matrix onto the base substrate overlaps each first overlapping region and does not overlap each second overlapping region, and an effective area of the first overlapping region is smaller than an effective area of the second overlapping region.

2. The touch substrate according to claim 1, wherein when each of the driving electrodes and the sensing electrodes is of a mesh-like structure, the effective area of each first overlapping region is a sum of areas of overlapping regions formed by orthogonal projections of mesh bars of the driving electrode onto the base substrate and orthogonal projections of mesh bars of the sensing electrode onto the base substrate in the first overlapping region, and the effective area of each second overlapping region is a sum of areas of overlapping regions formed by orthogonal projections of mesh bars of the driving electrode onto the base substrate and orthogonal projections of mesh bars of the sensing electrode onto the base substrate in the second overlapping region.

3. The touch substrate according to claim 1, wherein each driving electrode is of a mesh-like structure, the driving electrodes comprise first central driving electrodes and first peripheral driving electrodes, an orthogonal projection of each first central driving electrode onto the base substrate does not overlap the orthogonal projection of the black matrix onto the base substrate, an orthogonal projection of each first peripheral driving electrode onto the base substrate is located within the orthogonal projection of the black matrix onto the base substrate, and a mesh density of each first peripheral driving electrode is smaller than a mesh density of each first central driving electrode.

4. The touch substrate according to claim 1, wherein each sensing electrode is of a mesh-like structure, the sensing electrodes comprise first central sensing electrodes and first peripheral sensing electrodes, an orthogonal projection of each first central sensing electrode onto the base substrate does not overlap the orthogonal projection of the black matrix onto the base substrate, an orthogonal projection of each first peripheral sensing electrode onto the base substrate is located within the orthogonal projection of the black matrix onto the base substrate, and a mesh density of each first peripheral sensing electrode is smaller than a mesh density of each first central sensing electrode.

5. The touch substrate according to claim 3, wherein the mesh density of each first peripheral driving electrode is half of the mesh density of each first central driving electrode.

6. The touch substrate according to claim 4, wherein the mesh density of each first peripheral sensing electrode is half of the mesh density of each first central sensing electrode.

7. The touch substrate according to claim 1, wherein the driving electrodes extend in a first direction and comprise second central driving electrodes and second peripheral driving electrodes, an orthogonal projection of each second central driving electrode onto the base substrate partially overlaps the orthogonal projection of the black matrix onto the base substrate, an orthogonal projection of each second peripheral driving electrode onto the base substrate is located within the orthogonal projection of the black matrix onto the base substrate, and a maximum width of each second peripheral driving electrode is smaller than a maximum width of each second central driving electrode in a direction perpendicular to the first direction.

8. The touch substrate according to claim 1, wherein the sensing electrodes extend in a second direction and comprise second central sensing electrodes and second peripheral sensing electrodes, an orthogonal projection of each second central sensing electrode onto the base substrate partially overlaps the orthogonal projection of the black matrix onto the base substrate, an orthogonal projection of each second peripheral sensing electrode onto the base substrate is located within the orthogonal projection of the black matrix onto the base substrate, and a maximum width of each second peripheral sensing electrode is smaller than a maximum width of each second central sensing electrode in a direction perpendicular to the second direction.

9. The touch substrate according to claim 7, wherein the maximum width of each second peripheral driving electrode is half of the maximum width of each second central driving electrode in the direction perpendicular to the first direction.

10. The touch substrate according to claim 8, wherein the maximum width of each second peripheral sensing electrode is half of the maximum width of each second central sensing electrode in the direction perpendicular to the second direction.

11. The touch substrate according to claim 1, further comprising: a plurality of first dummy electrodes arranged at a same layer as the plurality of sensing electrodes, each first dummy electrode being of a same structure as the sensing electrode and being insulated from the corresponding sensing electrode; and a plurality of second dummy electrodes arranged at a same layer as the plurality of driving electrodes, each second dummy electrode being of a same structure as the driving electrode and being insulated from the corresponding driving electrode.

12. The touch substrate according to claim 1, further comprising an insulation layer arranged between the sensing electrode and the driving electrode.

13. The touch substrate according to claim 1, wherein the sensing electrode is arranged between the driving electrode and the base substrate.

14. A touch display device comprising the touch substrate according to claim 1 and a display pane, wherein the touch substrate is arranged at a light-exiting side of the display panel, and an orthogonal projection of the peripheral region of the touch substrate onto the display panel overlaps a non-display region of the display panel.

15. The touch display device according to claim 10, wherein the driving electrodes and the sensing electrodes of the touch substrate are arranged between the display panel and the base substrate of the touch substrate.

16. A method for manufacturing the touch substrate according to claim 1, comprising: forming a black matrix on a base substrate, the black matrix being arranged at the peripheral region of the touch substrate; and forming a plurality of driving electrodes and a plurality of sensing electrodes at different layers on the base substrate, wherein orthogonal projections of the driving electrodes onto the base substrate overlap orthogonal projections of the sensing electrodes onto the base substrate at a plurality of first overlapping regions and a plurality of second overlapping regions, an orthogonal projection of the black matrix onto the base substrate overlaps each first overlapping region and does not overlap each second overlapping region, and an effective area of the first overlapping region is smaller than an effective area of the second overlapping region.

17. The method according to claim 16, wherein the forming the plurality of sensing electrodes on the base substrate comprises: forming a first conductive thin film on the base substrate; and patterning the first conductive thin film to form the sensing electrodes and first dummy electrodes each of a mesh-like structure.

18. The method according to claim 17, wherein each sensing electrode is of a mesh-like structure, the sensing electrodes comprise first central sensing electrodes and first peripheral sensing electrodes, an orthogonal projection of each first central sensing electrode onto the base substrate does not overlap the orthogonal projection of the black matrix onto the base substrate, an orthogonal projection of each first peripheral sensing electrode onto the base substrate is located within the orthogonal projection of the black matrix onto the base substrate, and a mesh density of each first peripheral sensing electrode is smaller than a mesh density of each first central sensing electrode; or the sensing electrodes extend in a second direction and comprise second central sensing electrodes and second peripheral sensing electrodes, an orthogonal projection of each second central sensing electrode onto the base substrate partially overlaps the orthogonal projection of the black matrix onto the base substrate, an orthogonal projection of each second peripheral sensing electrode onto the base substrate is located within the orthogonal projection of the black matrix onto the base substrate, and a maximum width of each second peripheral sensing electrode is smaller than a maximum width of each second central sensing electrode in a direction perpendicular to the second direction.

19. The method according to claim 17, wherein the forming the plurality of driving electrodes on the base substrate comprises: forming an insulation layer at a side of each sensing electrode away from the base substrate; forming a second conductive thin film at a side of the insulation layer away from the base substrate; and patterning the second conductive thin film to form the driving electrodes and second dummy electrodes each of a mesh-like structure.

20. The method according to claim 19, wherein each driving electrode is of a mesh-like structure, the driving electrodes comprise first central driving electrodes and first peripheral driving electrodes, an orthogonal projection of each first central driving electrode onto the base substrate does not overlap the orthogonal projection of the black matrix onto the base substrate, an orthogonal projection of each first peripheral driving electrode onto the base substrate is located within the orthogonal projection of the black matrix onto the base substrate, and a mesh density of each first peripheral driving electrode is smaller than a mesh density of each first central driving electrode; or the driving electrodes extend in a first direction and comprise second central driving electrodes and second peripheral driving electrodes, an orthogonal projection of each second central driving electrode onto the base substrate partially overlaps the orthogonal projection of the black matrix onto the base substrate, an orthogonal projection of each second peripheral driving electrode onto the base substrate is located within the orthogonal projection of the black matrix onto the base substrate, and a maximum width of each second peripheral driving electrode is smaller than a maximum width of each second central driving electrode in a direction perpendicular to the first direction.

\* \* \* \* \*